Feb. 16, 1971   H. HAUSER   3,563,110
TRANSMISSION SHIFT
Filed June 30, 1969   2 Sheets-Sheet 1
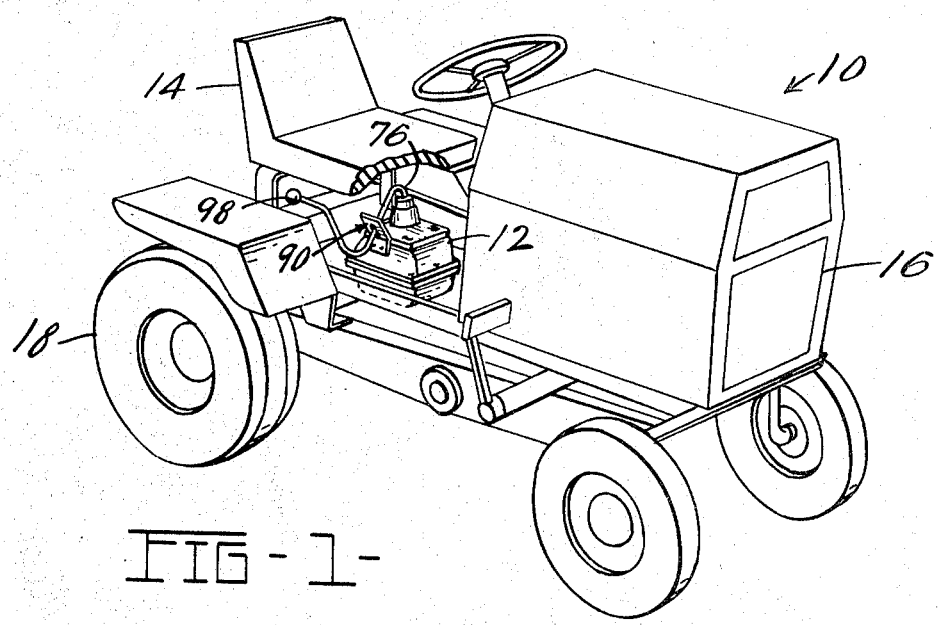
FIG-1-
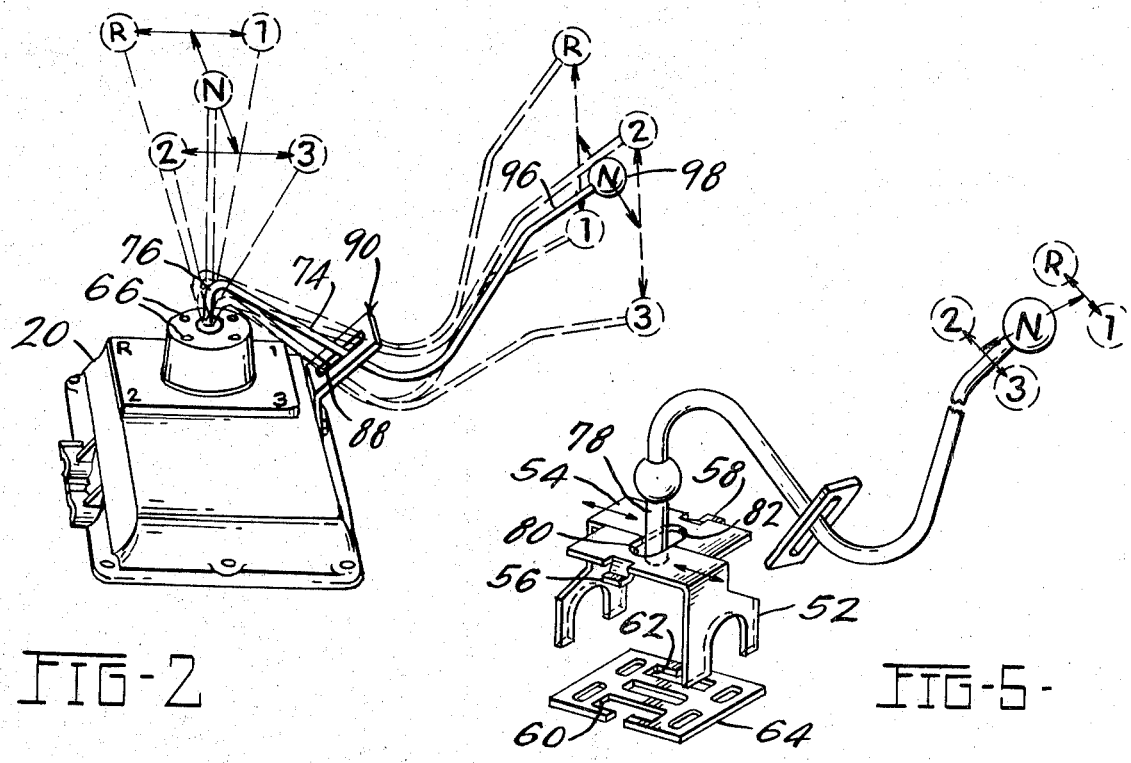
FIG-2   FIG-3-
INVENTOR:
HANS HAUSER.
BY
ATT'YS.

Feb. 16, 1971  H. HAUSER  3,563,110
TRANSMISSION SHIFT
Filed June 30, 1969  2 Sheets-Sheet 2
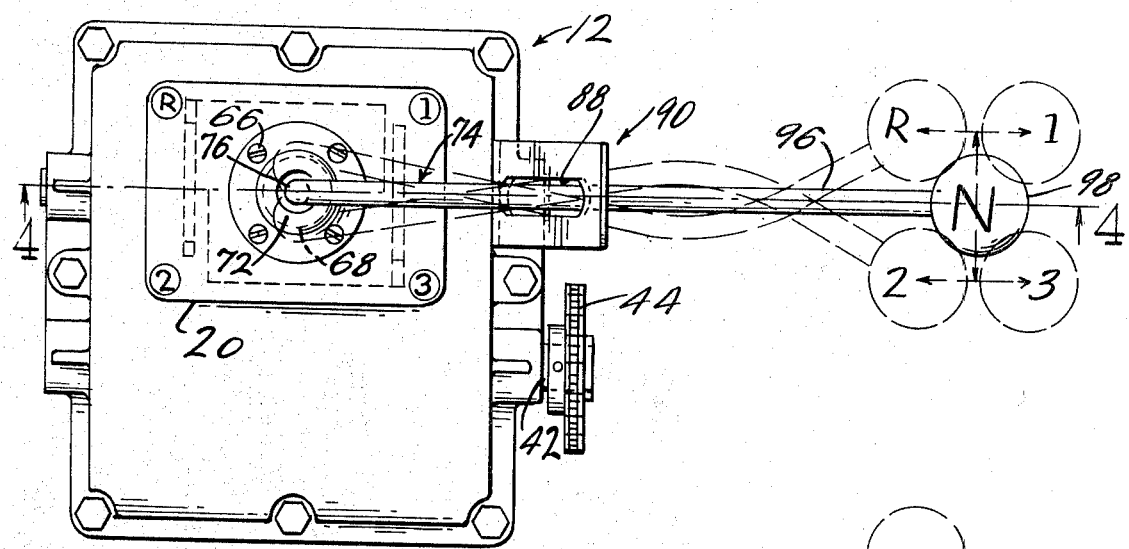
FIG-3-
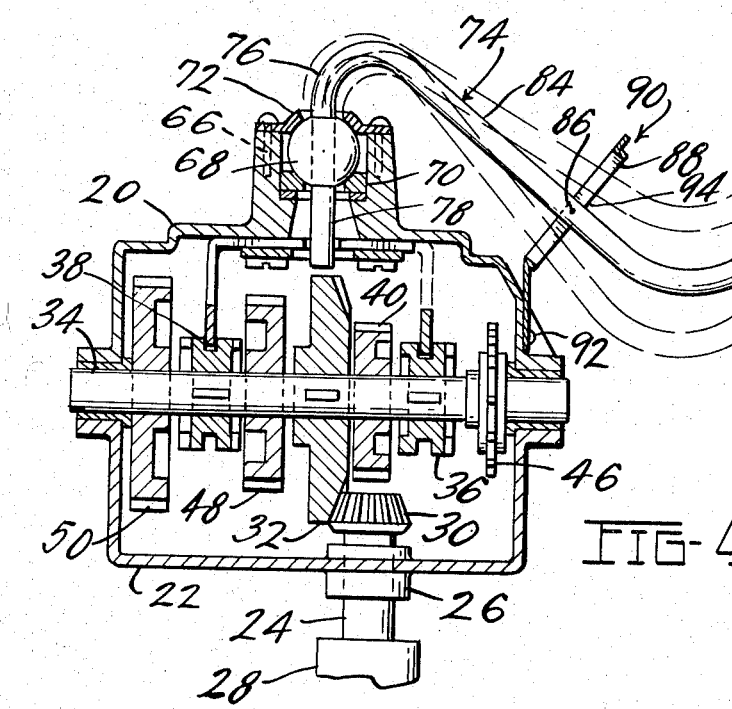
FIG-4-
INVENTOR:
HANS HAUSER.
BY
ATT'YS.

United States Patent Office 3,563,110
Patented Feb. 16, 1971

3,563,110
TRANSMISSION SHIFT
Hans Hauser, Fredericktown, Ohio, assignor to The J. B. Foote Foundry Co., Fredericktown, Ohio, a corporation of Ohio
Filed June 30, 1969, Ser. No. 837,415
Int. Cl. G05g 9/00
U.S. Cl. 74—473        8 Claims

ABSTRACT OF THE DISCLOSURE

A shift is proivded for a transmission used with a small vehicle such as a garden tractor or a riding mower. The shift for the transmission is desiged to be accessible from the side of the vehicle so that shifting can be effected even though the transmission is positioned or mounted so that it cannot be shifted through the usual upright shift lever. The shift lever is formed in an "N" configuration with a central portion extending through a guide bracket mounted on the transmission to limit the movement of an intermediate portion of the shift lever and to form a second pivot for the lever when in neutral.

---

This invention relates to a transmission shift and more particularly to a shift for a small transmission which can be operated from a position at one side of the transmission.

Various types of small transmissions are known in the art for use with small vehicles, such as garden tractors and riding lawnmowers. Particularly for such vehicles, it has been common to locate the transmission immediately in front of the driver with the transmission shift lever extending substantially upright between the legs of the driver for ready accessibility. In some instances, however, the transmission is mounted under the seat or in some other location so that an upright shift lever cannot be effectively employed. For some types of transmissions, such as those employing linear shift mechanisms, as shown in my United States Pat. 3,426,611, such a location for the transmission poses no problem, particularly since the shift levers for such transmissions are mounted primarily for horizontal movement anyway. However, for other transmissions, such as four-speed transmissions employing shiftable forks, side shift levers used with such transmissions have been less than satisfactory. Where the shift levers have been redesigned with such transmissions to extend to one side for accessibility from the side of the vehicle, shifting has been difficult because of binding of the shift mechanism or because, in certain positions, greater torque is required to shift the transmisison, resulting in somewhat erratic shifting operation.

The present invention provides a transmission shift which enables a transmission to be shifted smoothly and easily from the side. The shift is particularly suitable for a four-speed transmission, three speeds forward and one reverse, which employs a pair of side-by-side shifting forks to effect the shifting within the transmission. Such shifting is usually accomplished in this type of transmission through movement of the shift lever in an H-shaped pattern. The new shift includes a shift lever having a first portion extending upwardly from the transmission housing and through a shift ball capable of rotation in any direction. The first lever portion has an extension below the ball which can be selectively engaged with either of the shifting forks in a known manner. The shift lever includes a second portion above the housing, this portion extending outwardly and downwardly from the first portion. A third portion can extend upwardly from the second portion beyond the side of the vehicle to a location nearer the operator. An intermediate part of the second portion of the shift lever extends through a slotted bracket with a vertical guide slot therein to limit movement of this part of the shift lever to a vertical direction and to rotation generally about an axis through the intermediate part and the center of the ball. The bracket also cooperates with the second portion of the lever to provide an additional pivot point for the lever when in neutral.

With this new shift arrangement, a substantially uniform torque is provided for the shift lever, making shifting easier and smoother. Further, by the elimination of the usual pin extending through the shift ball, binding of the shift mechanism is substantially eliminated.

It is, therefore, a principal object of the invention to provide an improved shift mechanism for a transmission for a small vehicle.

Another object of the invention is to provide a transmission shift which enables shifting of the transmission from the side of a vehicle in which the shift is mounted.

Still another object of the invention is to provide a shift arrangement for a transmission which operates more smoothly and with less binding than heretofore.

Other objects and advantages of the invention will be apparent from the following detailed description of a preferred embodiment thereof, references being made to the accompanying drawings, in which:

FIG. 1 is a view in perspective of a garden tractor with a transmission embodying the invention;

FIG. 2 is a view in perspective of part of the transmission of FIG. 1, and showing the various shift positions;

FIG. 3 is a top view of the transmission of FIGS. 1 and 2;

FIG. 4 is a view in transverse cross section, taken along the line 4—4 of FIG. 3; and FIG. 5 is a view in perspective of a shift lever and shifting mechanism of the transmission.

Referring to FIG. 1, a garden tractor generally indicated at 10 is of a generally conventional design and will not be discussed in detail. The tractor incorporates a transmission indicated at 12 which is located partially under a seat 14. In such an instance, it is preferred to have the shift for the transmission extending to the side of the tractor rather than forwardly and upwardly between the legs of the operator. The transmission has a lower vertical input shaft which is driven by a motor located under a hood 16. The transmission further has an output shaft which, in this instance, can be driven at three different speeds forward and one speed in reverse to correspondingly drive rear wheels 18 through a chain drive. When the transmission 12 is used with a conventional upright shift lever, there is little problem in shifting. However, with previous side shift arrangements, the shift has been found to have a tendency to bind and, further, the amount of torque on the shift lever necessary for shifting varies for the particular position of the shift lever, thereby making shifting more difficult and erratic.

The details of the transmission 12 do not constitute part of the invention; however, a brief discussion of the components therein will be helpful in understanding the invention. Referring to FIG. 4, the transmission 12 includes an upper housing 20 and a lower housing 22. A driven, input shaft 24 is rotatably carried in a hub 26 of the housing 22 and is driven by the tractor motor through a pulley 28. Within the housing 22 is a bevel drive gear 30. This gear engages a bevel driven gear 32 which is suitably affixed to a first shaft 34. The shaft 34 thereby is rotated at a speed commensurate with the speed of the engine.

A pair of shifting dogs 36 and 38 are keyed to the shaft 34 and rotate therewith. When the dog 36 is moved to the left end engages a first spur gear 40, the gear 40 is rotated with the shaft 34. The gear 40, in turn, meshes with a gear (not shown) on an output shaft 42 and turns an output sprocket 44 (FIG. 3) at a first speed. The sprocket 44 is connected by the chain drive to the rear axle and turns the wheels 18 at a first speed. When the first dog 36 is moved to the right and engages a sprocket 46, the sprocket drives the output sprocket 44 in reverse through a chain and a sprocket on the output shaft 42.

When the second shifting dog 38 is moved to the right, a second spur gear 48 is rotated with the shaft 34 and, through another spur gear on the shaft 42, drives the output sprocket 44 at a second forward speed. Finally, when the shifting dog 38 is moved to the left, it causes a third spur gear 50 to rotate with the shaft 34 which drives the output sprocket 44 at a third forward speed.

Referring to FIG. 5, the first shifting dog 36 is moved left and right axially of the shaft 34 by a first shifting fork 52 while the second shifting dog 38 is moved axially of the shaft 34 by a second shifting fork 54. As is known in the art, the shifting forks have ears 56 and 58 which are received in slots 60 and 62 of a locking plate 64. The ears and plate cooperate with one another so that it is impossible for either of the shifting forks 52 and 54 to move their respective shifting dogs axially unless the other shifting fork is in neutral. This prevents any possibility of two of the rotatably-mounted components 36, 46, 48 and 50 to be engaged at the same time. When each of the shifting forks 52 and 54 is moved to its respective three positions—left, right, and neutral—it is held there by spring-loaded balls which engage notches or recesses formed in the upper surfaces of the forks. These are conventional in the art and are not shown for clarity of illustration.

Referring now to the shift arrangement according to the invention, the upper housing 20 has a shifter extension 66 in which a shifter ball 68 is rotatably held by a lower plastic ring 70 and an upper cap 72. The shifter ball 68 is free to rotate in any direction, not being restrained by positioning pins, as has been true of shifter balls heretofore employed with vertically extending shift levers. A shift lever 74, according to the invention, is formed in an "N" configuration. The lever includes a first portion 76 extending upwardly from the shifter extension 66 and, in turn, has a lower extension 78 below the shifter ball 68 which is received in notches 80 and 82 (FIG. 5) of the shifter forks 52 and 54 and is effective to move the forks between their positions described above. The shift lever 74 further has an intermediate downwardly-extending portion 84 extending beyond the side of the housing 20 and, in this instance, beyond the seat 14 of the tractor 10.

An intermediate part or point 86 of the lever portion 84 extends through a slot 88 in a bracket 90. The bracket 90 has a lower flange 92 affixed to the side of the housing 20, as by rivets or any other suitable means, with the slot 88 formed in an upwardly-extending portion 94. The portion 94 is positioned substantially perpendicularly to the intermediate lever portion 84 when in a central position in the slot 88, as shown in FIG. 4. Finally, the lever 74 has a third, upwardly-extending portion 96 at the upper end of which is a handle 98 located near the level of the seat 14 for easy manipulation by an operator sitting on the seat.

The bracket 90 and the slot 88 guide the lever 74 for vertical movement but prevent horizontal movement of the intermediate portion 84 and specifically the part 86 which forms a second pivot point for the lever 74, the first pivot point being the center of the shifter ball 68. In the shifting of the lever 74, a neutral line of movement designated N is substantially horizontal and parallel to the line of movement of the tractor. Both pivot points control movement of the lever forwardly and rearwardly on the neutral line. However, when the lever 74 is in the forward position and is raised, the lever pivots only about the pivot point at the center of the shifting ball 68. At the forward end of the neutral line, when the handle 98 is raised, the transmission is shifted, in this instance, to reverse. When the lever 74 is moved to the forward position, the extension 78 moves to the rear and into the notch 80. When the lever is raised, and pivots only about the ball 68, the extension 78 then moves the shifter fork 52 toward the right, as shown in FIGS. 4 and 5, and causes the sprocket 46 to rotate with the shaft 34.

When the lever is in the forward position and moved downwardly, the same shifter fork 52 is then moved to the left by the extension 78, causing the shifter dogs 36 to engage the first speed gear 40, so that it will rotate with the shaft 34.

When the shifting lever 74 is moved to the neutral When the lever is in the forward position and moved into the notch 82 and the handle can then be raised to move the shifter fork 54 toward the right and cause the shifter dog 38 to engage the second speed gear 48. Finally, when the handle 98 is in the rear position and lowered, the shifter fork 54 causes the dog 38 to engage the third speed gear 50.

When the shift lever 74 is moved forwardly and rearwardly in the neutral position, the axis of rotation of the lever is actually about a line extending through the center of the shifter ball 68 and the point 86 which enables movement of the shift lever 74 to be free and smooth, without binding. At the same time, the bracket 90 enables vertical movement of the lever 74 in the forward and rearward positions without interference.

Various modifications of the above described embodiment of the invention will be apparent to those skilled in the art and it is to be understood that such modifications can be made without departing from the scope of the invention, the embodiment shown and described being primarily for purposes of illustration and not limitation.

I claim:

1. In combination, a transmission housing, a shift lever having a first portion extending upwardly from said housing, a second portion extending outwardly and downwardly from said first portion, and a third portion extending upwardly from said second portion and terminating in a handle, means mounted in a fixed position relative to said housing and cooperating with part of said second portion of said lever to enable substantially only vertical movement and rotatable movement of said part to enable said handle to be moved in an H-shaped pattern for effecting shifting of said transmision between and among the various speeds and directions thereof.

2. The combination according to claim 1 characterized by said means is mounted on said housing and comprises a bracket having a slotted portion through which said part of said second portion of said lever extends with said slotted portion being substantially perpendicular to said second portion of said lever when said part of said second portion is in a central portion of said slot.

3. The combination according to claim 1 characterized further by a shifter ball rotatably supported in said housing and affixed to said first portion of said shift lever, said shift lever being pivotable about an axis extending through the center of said shifter ball and through said part of said second portion when in neutral.

4. Shifting means for a multi-speed transmission comprising a shift lever having a first portion extending upwardly, a second portion extending outwardly and downwardly from said first portion, and a third portion extending upwardly from said second portion and terminating in a handle, a bracket having an upwardly extending slotted portion, said second portion of said lever having a part extending through said slot and prevented from horizontal movement.

5. Shifting means according to claim 4 characterized by a shifter ball mounted on said first portion of said shift lever, a center of said shifter ball and said part of said second portion of said shift lever forming pivot points about which said shift lever can pivot.

6. A transmission comprising a transmission housing, a shifter ball carried by said housing for unrestricted rotatable movement relative thereto, a shift lever having a first portion including an extension below said shifter ball and a portion extending upwardly above said shifter ball in general alignment with said extension, said extension being engageable with shifting mechanism located within said housing, a second portion extending outwardly and downwardly from said first portion and at an acute angle to said first portion, a third portion extending upwardly from an outer end of said second portion and terminating in a handle portion, and guide means mounted in a fixed position relative to said transmission housing and engageable with part of said shift lever to limit movement of said part to a vertical plane and to rotation about an axis through said part and through said shifter ball, whereby said transmission can be shifted by manipulating said handle portion in an H-shaped pattern.

7. A transmission according to claim 6 characterized by said guide means having a vertical elongate opening through which said lever part extends, said lever part being part of said second portion of said shift lever.

8. A transmission according to claim 6 characterized further by said guide means being located at about the same level as said shifter ball.

References Cited

UNITED STATES PATENTS

| | | | |
|---|---|---|---|
| 1,712,938 | 5/1929 | Short et al. | 74—473 |
| 2,273,068 | 2/1942 | Ross et al. | 74—473 |
| 3,251,237 | 5/1966 | Warmkessel | 74—473 |

MILTON KAUFMAN, Primary Examiner

UNITED STATES PATENT OFFICE
CERTIFICATE OF CORRECTION

Patent No. 3,563,110                    Dated February 16, 1971

Inventor(s) Hans Hauser

It is certified that error appears in the above-identified patent and that said Letters Patent are hereby corrected as shown below:

In column 1, line 15, correct the spelling of "designed column 3, line 5, change "end" to --and--; column 4, line 24, delete "When the lever is in the forward", after "and" insert --then rearward the extension 78 is--.

Signed and sealed this 19th day of October 1971.

(SEAL)
Attest:

EDWARD M.FLETCHER,JR.          ROBERT GOTTSCHALK
Attesting Officer              Acting Commissioner of Paten